United States Patent
Wu et al.

[19]

[11] Patent Number: 5,959,693
[45] Date of Patent: Sep. 28, 1999

[54] PIXEL ADAPTIVE NOISE REDUCTION FILTER FOR DIGITAL VIDEO

[75] Inventors: Siu-Wai Wu; Jay R. Patel; Robert Nemiroff, all of San Diego; John Shumate, Encinitas, all of Calif.

[73] Assignee: General Instrument Corporation, Horsham, Pa.

[21] Appl. No.: 08/852,467

[22] Filed: May 7, 1997

[51] Int. Cl.$^6$ .................................................. H04N 5/21
[52] U.S. Cl. .......................... 348/624; 348/606; 348/625; 382/263; 382/266
[58] Field of Search .................................. 348/606, 607, 348/608–610, 622, 624, 625, 627, 631; 382/161, 206, 202, 116, 266–268, 260–262

[56] References Cited

U.S. PATENT DOCUMENTS

| | | |
|---|---|---|
| 4,009,334 | 2/1977 | Sypula . |
| 4,107,736 | 8/1978 | Lowry et al. . |
| 4,240,106 | 12/1980 | Michael et al. . |
| 4,249,209 | 2/1981 | Storey . |
| 4,249,210 | 2/1981 | Storey et al. . |
| 4,275,418 | 6/1981 | Trump et al. . |
| 4,278,996 | 7/1981 | Netravali ................................. 358/136 |
| 4,399,461 | 8/1983 | Powell ..................................... 358/166 |
| 4,571,511 | 2/1986 | Dischert et al. . |
| 4,573,070 | 2/1986 | Cooper . |
| 4,670,775 | 6/1987 | Faroudja et al. . |
| 4,672,429 | 6/1987 | Faroudja et al. . |
| 4,725,885 | 2/1988 | Gonzales et al. ........................ 358/135 |
| 4,783,840 | 11/1988 | Song ....................................... 348/607 |
| 4,792,854 | 12/1988 | Glenn ...................................... 348/625 |
| 4,918,528 | 4/1990 | Oohashi .................................. 348/625 |
| 4,926,261 | 5/1990 | Matsumoto et al. . |
| 4,987,481 | 1/1991 | Spears et al. . |
| 5,023,919 | 6/1991 | Wataya ..................................... 382/54 |
| 5,025,312 | 6/1991 | Faroudja . |
| 5,025,316 | 6/1991 | Darby . |
| 5,025,478 | 6/1991 | Morris et al. ............................ 382/266 |
| 5,040,225 | 8/1991 | Gouge ..................................... 382/266 |
| 5,151,787 | 9/1992 | Park ......................................... 358/162 |

(List continued on next page.)

OTHER PUBLICATIONS

A.N. Netravali et al., "Digital Pictures—Representation, Compression and Standards", 1995, Plenum Press, pp. 548–552.

J.C. Brailean et al., "Noise Reduction Filters for Dynamic Image Sequences: A Review," *Proc. of the IEEE,* vol. 83, No. 9, Sep. 1995, pp. 1272–1292.

S.K. Mitra et al., "Efficient Detail–Preserving Method of Impulse Noise Removal From Highly Corrupted Images," *SPIE vol. 2182 Image and Video Processing II,* 1994, pp. 43–48.

*Primary Examiner*—Andrew I. Faile
*Assistant Examiner*—Reuben M. Brown
*Attorney, Agent, or Firm*—Barry R. Lipsitz; Ralph F. Hoppin

[57] ABSTRACT

A current pixel of a video image is adaptively filtered to provide stronger filtering when there is a high likelihood that noise is present. Weaker filtering is provided when the presence of a color and/or brightness edge is likely in the video image. Each pixel has luminance and chrominance amplitude values. In a filtering method, a current pixel is intermediate to first and second pixels in the video frame. Difference signals are determined based on the amplitude difference between the current pixel and first and second adjacent pixels. A plurality of available filters provide successively stronger filtering of the current pixel amplitude. One of the filters is selected for filtering the current pixel according to the difference signals. Secondary difference signals which indicate the amplitude difference between the current pixel and pixels which are adjacent to the first and second pixels are also considered in the selection process. The selection process may further be biased by a user-selectable control word. The scheme may also provide temporal filtering with successive video frames or images. Filtering with pixel interpolation may also be used.

24 Claims, 5 Drawing Sheets

U.S. PATENT DOCUMENTS

| | | | |
|---|---|---|---|
| 5,293,541 | 3/1994 | Ito | 348/625 |
| 5,294,984 | 3/1994 | Mori et al. | 348/625 |
| 5,321,511 | 6/1994 | Min | 348/625 |
| 5,327,242 | 7/1994 | Naimpally et al. . | |
| 5,363,210 | 11/1994 | Sasaki et al. | 382/266 |
| 5,392,137 | 2/1995 | Okubo | 358/462 |
| 5,400,082 | 3/1995 | Kamiya | 348/619 |
| 5,442,407 | 8/1995 | Iu . | |
| 5,491,519 | 2/1996 | Kim | 348/608 |
| 5,491,520 | 2/1996 | Nozawa et al. | 348/625 |
| 5,512,956 | 4/1996 | Yan | 348/606 |
| 5,574,512 | 11/1996 | Saeger . | |
| 5,602,942 | 2/1997 | Takemoto et al. | 382/266 |
| 5,606,361 | 2/1997 | Weiss et al. | 348/607 |
| 5,745,187 | 4/1998 | Hulyalkar | 348/607 |

PIXEL ADAPTIVE NOISE REDUCTION FILTER FOR DIGITAL VIDEO

BACKGROUND OF THE INVENTION

The present invention relates to an apparatus and method for reducing the presence of noise in a digital video image. The invention provides adaptive pre-processing of image data prior to compression and transmission to enhance the quality of the received image. A low-cost implementation comprising finite impulse response (FIR) filters is also disclosed.

A video image is defined by a number of picture elements, also known as pixels or pels. A pixel, which is the smallest element of a raster scan line in the image, has an associated color space. For example, in a YCrCb color space which conforms to the CCIR 601 specification, Y is a luminance component, and Cr and Cb are color difference components. Y is defined to have a nominal range of 16 to 235, with Cr and Cb each having ranges from 16 to 240, with 128 indicating a zero color difference (e.g., the color white). Various sampling formats have been defined, including 4:4:4, 4:2:2, and 4:1:1. For example, with a 4:2:2 format, the Y component is sampled at twice the rate of the Cr and Cb components. With this format, the sampling frequencies for the Y, Cr and Cb components are 13.5 MHz, 6.75 MHz and 6.75 MHz, respectively. Typically each component comprises 8 data bits for standard video and computer applications, while high-end video applications, such as those conforming to the D1 standard, may use 10 bits per component. Thus, a single pixel may be defined by 24 or 30 bits. The YCrCb color space is a scaled version of the YUV color space commonly used with the Phase Alternation Line (PAL), National Television System Committee (NTSC), and the Sequentiel Coleur Avec Memoire (SECAM) standards. Various other color space standards exist.

Noise can be introduced into the pixel data prior to compression and transmission from various sources, including imaging equipment, recording equipment, channel noise in a channel over which the pixel data is communicated, and atmospheric factors. Moreover, noise in the pre-compressed video data hampers the performance of subsequent compression systems. Specifically, noise consumes data bits unnecessarily and deteriorates the visual quality of the resulting video image since compression processing, such as quantizing the coefficients of the Discrete Cosine Transformation or other spatial transformation, tends to increase the visibility of the noise. Thus, the presence of pixel noise can be amplified, leading to visible noise artifacts and other image degradation.

Compression encoding is typically performed on the pixel data prior to transmission to decrease the required bandwidth of the communication channel. Various video data compression standards are well known in the art, including the MPEG-2 standard, and the similar DigiCipher® II system, proprietary to the assignee hereof.

While filtering can reduce noise in a video image, it is desirable to avoid unnecessary filtering which can reduce the resolution (e.g., sharpness) of an image. Such over-filtering of pixel data reduces resolution by making it harder for the viewer to detect transitions, or edges, between image elements. Generally, an edge is a change in pixel amplitude, such as a color difference and/or luminance amplitude change, which may indicate the edge or outline of an object in an image. For example, a video image of a green field and a blue sky will exhibit an edge at the transition between the field and the sky. Similarly, a video image of a bright area and a shadowy area will exhibit an edge at the transition area. Accordingly, it has been problematic to preserve such true edges while reducing the effects of noise.

Accordingly, it would be desirable to provide a method and apparatus for reducing noise in a pre-compressed digital video signal. It would be desirable to provide a low-cost apparatus to filter each pixel in a video image by detecting the likelihood of the presence of an edge by computing the changes in pixel amplitude values on both sides of a current pixel in a frame, and/or by computing the changes in pixel amplitude values in video frames which precede and follow a current pixel frame. The system should effectively attenuate noise while minimizing any degradation in picture resolution. The present invention provides a system having the above and other advantages.

SUMMARY OF THE INVENTION

In accordance with the present invention, an apparatus and method are presented for reducing the presence of noise in a digital video image.

Video image data is provided which includes at least one video frame having a plurality of pixels. Each pixel has associated luminance and chrominance amplitudes. For example, in a YCrCb color space, each pixel has a luminance Y amplitude, a color difference signal Cr amplitude, and a color difference signal Cb amplitude. Each pixel in the frame is processed sequentially, with luminance and chrominance components being processed separately.

First, a current pixel is determined. The current pixel is intermediate to (e.g., between) first and second pixels in the video frame. For example, the first and second pixels may be adjacent to the current pixel on the left and right hand sides, respectively, in a pixel row. Other in-frame arrangements may be used, as well as frame to frame filtering. Pixels obtained by interpolation may also be used. The term "intermediate" is used herein to represent a pixel relationship either within a frame, and/or between frames.

A difference, d1, between the amplitude of the current pixel and the amplitude of the first pixel is determined, while a difference, d2, between the amplitude of the current pixel and the amplitude of the second pixel is similarly determined. A plurality of filters, such as inexpensive 3-tap finite impulse response (FIR) filters are provided. The filters have associated kernels which provide successively stronger levels of low-pass filtering (e.g., averaging) of the current pixel amplitude.

One of the filters is selected according to the differences d1 and d2 for filtering the current pixel. In particular, the magnitude and signs of d1 and d2 indicate the likelihood that the pixel data represents a color or brightness edge in the video frame, or whether it is more likely that the pixel data is corrupted by noise. Generally, a stronger filter is selected when the magnitudes of d1 or d2 is small. Moreover, the filter selection may be modified according to whether the amplitudes of the first, current and second pixels form a sequence which is monotonically increasing or decreasing, or continuously increasing or decreasing.

A relatively stronger filter is selected when the amplitudes of the first and second pixels are both greater than, or both less than, the amplitude of the current pixel (i.e., the differences d1 and d2 have the same sign), than when the amplitude of the current pixel is intermediate to the amplitudes of the first and second pixels (i.e., the differences d1 and d2 have opposite signs). Furthermore, a relatively stronger filter is selected for filtering the current pixel when the magnitudes of both d1 and d2 are greater than zero, or greater than a threshold range near zero, than when one of d1 and d2 is close to zero. When one of d1 and d2 is zero or close to zero, the likelihood that the current pixel is part of an edge is relatively high, so weaker filtering can be used.

Additionally, the filter selection may be adjusted by a user-selectable control signal to provide an incrementally stronger or weaker level of filtering to account for the particular video signal being processed. For example, the user may view a video program before or during processing and transmission to determine subjectively whether the program is relatively noisy, in which case an incrementally stronger filter should be selected.

To enable an inexpensive implementation using lookup tables, the difference signals d1 and d2 may be quantized, and the filter selected according to the quantized difference values.

Furthermore, when the luminance component of the current pixel is being processed, it is desirable to consider the luminance amplitudes of third and fourth pixels in the video frame. For example, the third pixel may be adjacent to the first pixel, while the fourth pixel may be adjacent to the second pixel. Thus, the first, current and second pixels are intermediate to the third and fourth pixels. Difference signals e1 and e2 are determined, where e1 is the difference in amplitude between the first and third pixels, and e2 is the difference in amplitude between the second and fourth pixels. The filter selection process then accounts for e1 and e2 as well as d1 and d2.

e1 and e2 are quantized and input to a lookup table to provide a mapping value which adjusts the filter selection process. In particular, when the quantized values of either e1 or e2 are zero, or in a threshold range near zero, the user-selected control word is overridden and an incrementally weaker filter is used since this condition indicates that the current pixel is part of an image edge and strong filtering should be avoided. Otherwise, when neither e1 nor e2 is zero, or in a range near zero, the user selected control word is not modified.

The difference signals e1 and e2 need not be considered for chrominance processing since humans are less sensitive to chroma changes than to luma changes.

Frame-to-frame (e.g., temporal) filtering may also be provided.

Corresponding apparatus is also presented.

DETAILED DESCRIPTION OF THE INVENTION

A method and apparatus are presented for reducing the presence of noise in a digital video image.

Figure 1:
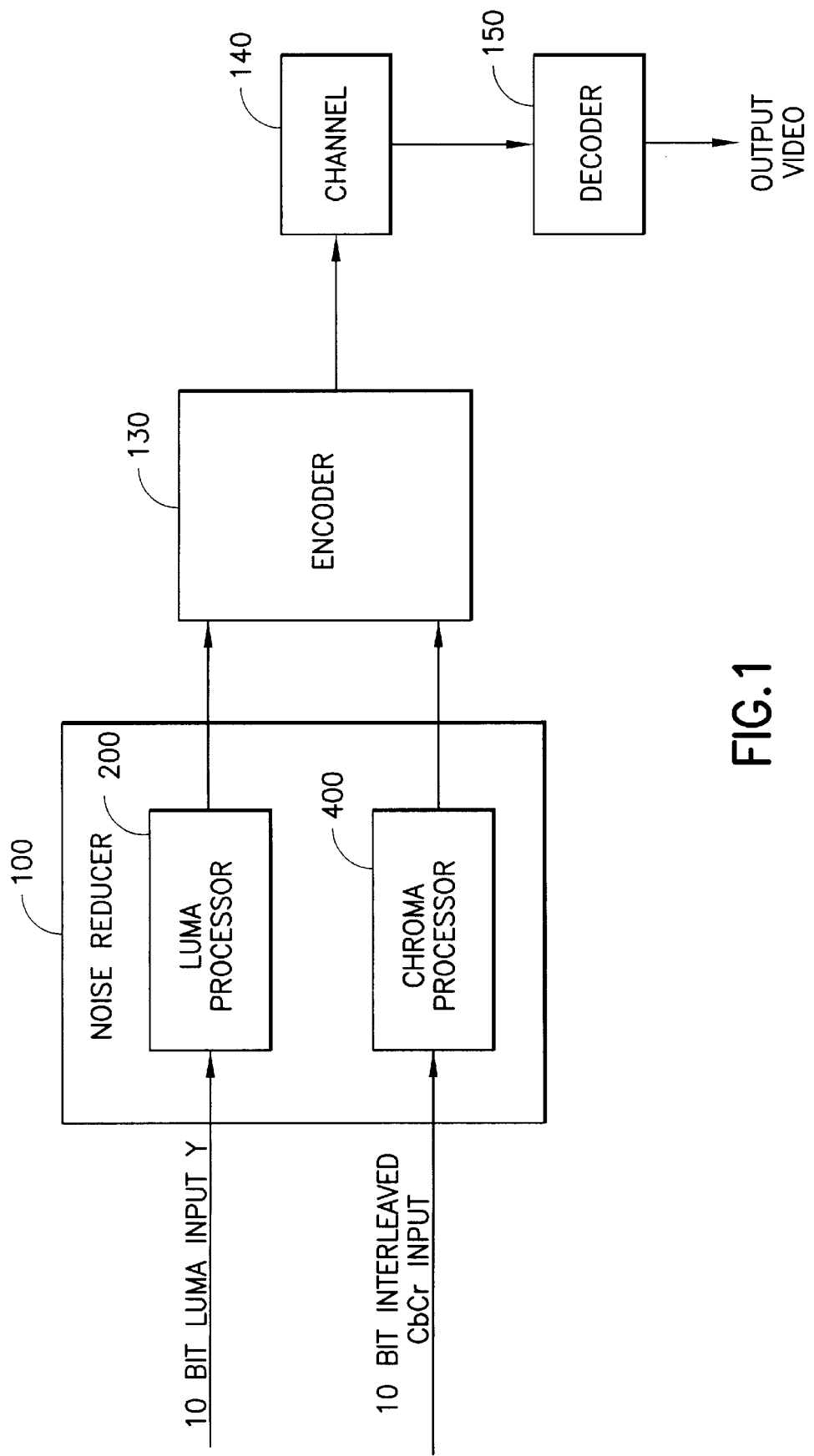
FIG. 1 is a block diagram of a video compression subsystem with a front end noise reducer in accordance with the present invention.

FIG. 1 is a block diagram of a video compression subsystem with a front end noise reducer in accordance with the present invention. The noise reducer 100 includes a luma (e.g., luminance) noise reducer processor 200 and a chroma (e.g., chrominance) noise reducer processor 400. It is possible to process either the chroma or luma pixel data alone, although best results are obtained by processing both the luma and chroma components of the pixel data as described herein. Moreover, preferably each pixel in a video frame is processed. The luma processor 200 receives input luma data such as a 10 bit luma word, while the chroma processor 400 receives a 10 bit interleaved chroma signal, CbCr. Cb and Cr are color difference components. The pixel data is pre-processed by the noise reducer 100 to provide corresponding processed signals to an encoder 130. The encoder performs conventional video compression coding to provide a signal which is suitable for communication over a communication channel 140 to one or more decoders such as decoder 150. For example, the decoder 150 may be a set-top box which is located in a consumer's home for receiving and decoding digital television signals to provide an output video signal for display on a television. The pixel data may be provided in a YCrCb color space using a 4:2:2 sampling format, for example.

Figure 2:
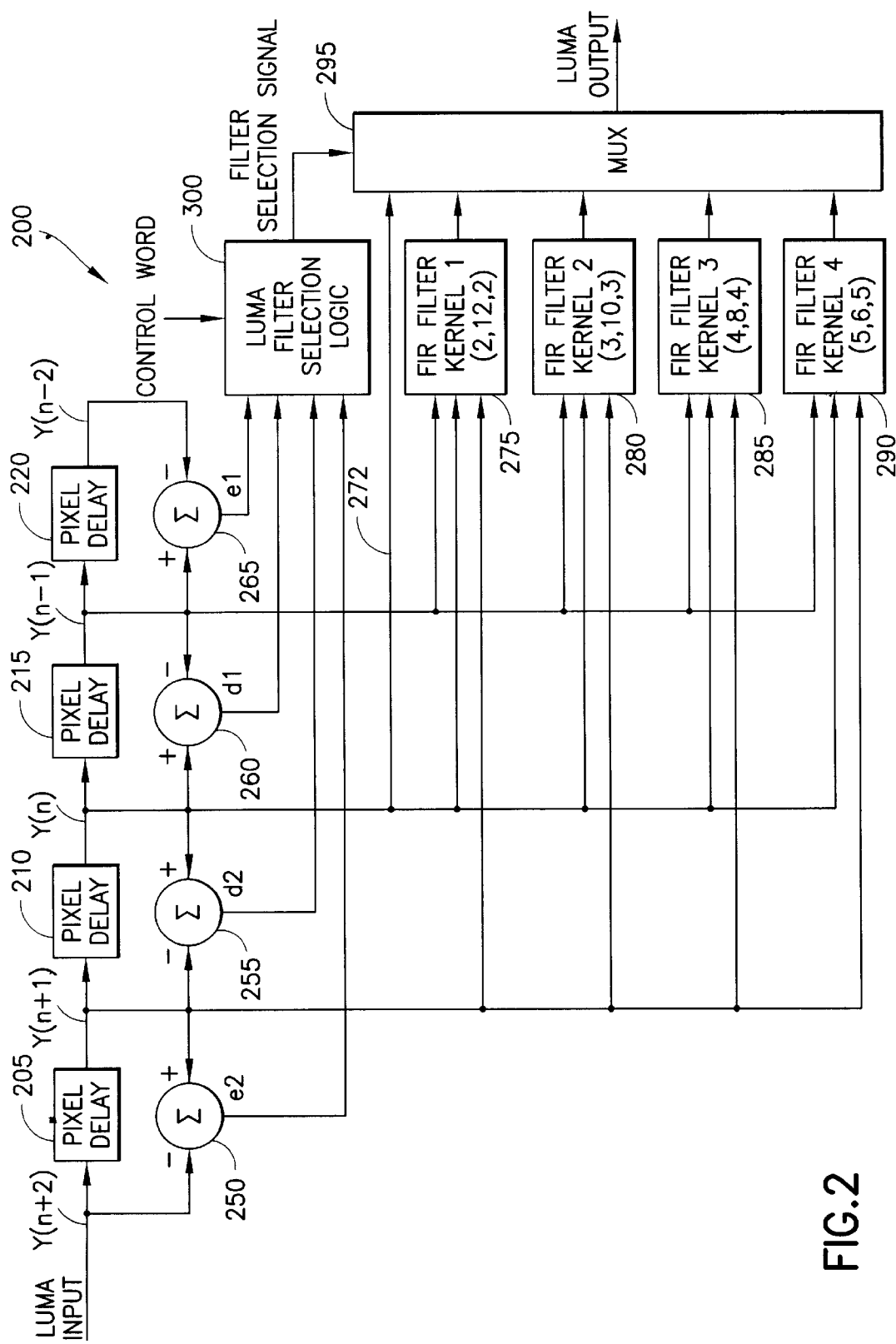
FIG. 2 is a block diagram of a luminance noise reducer in accordance with the present invention.

FIG. 2 is a block diagram of a luminance noise reducer in accordance with the present invention. The noise reducer, shown generally at 200, processes a luma input signal through a series of pixel delays 205, 210, 215 and 220. In the embodiment shown, a current pixel is filtered using the luminance data from a total of four neighboring pixels, in addition to the luminance data of the current pixel itself. For example, in a video scan line, a current pixel may be filtered using the two neighboring pixels which are immediately adjacent on the left hand side of the current pixel, and the two neighboring pixels which are immediately adjacent on the right hand side of the current pixel. Optionally, only two neighboring pixels may be used.

Additionally, with in-frame filtering, it will be appreciated that pixel data which extends in a horizontal or vertical row of the current pixel may be used. Furthermore, the present invention may be adapted to use neighboring pixels in both horizontal and vertical directions, and/or to use neighboring pixels which are located diagonally in the video image relative to the current pixel. In a preferred embodiment, the luma processor 200 filters current pixel luma data using four neighboring in-frame pixels in a common row.

Alternatively, or in addition, it is possible to filter the current pixel on a temporal basis using pixel data from one or more preceding frames and one or more subsequent frames. In this case, pixels which are located in corresponding locations in the frames are used.

In the luma processor 200, a current (e.g., nth) pixel Y(n) is defined as the 10-bit luminance amplitude value which is output from the pixel delay 210. Therefore, the luminance component output from the pixel delay 215 is Y(n−1), and the luminance component output from pixel delay 220 is Y(n−2). Similarly, the pixel data output from the pixel delay 205 is Y(n+1), and the pixel data input to the pixel delay 205 is Y(n+2). The pixel delays 205, 210, 215 and 220 may be implemented as 10-bit shift registers.

A subtractor 250 outputs a difference signal e2=Y(n+1)−Y(n+2), while a subtractor 255 outputs a difference signal d2=Y(n)−Y(n+1), a subtractor 260 outputs a difference signal d1=Y(n)−Y(n−1), and a subtractor 265 outputs a difference signal e1=Y(n−1)−Y(n−2). Preferably, only the seven most significant bits of the 10-bit input values are applied to the subtractors. Each of the difference signals d1, d2, e1 and e2 are provided to a filter selection logic function 300. The difference signals are 8-bit sign-magnitude integer values that range from −127 to 127. The filter selection logic function 300 also receives a two-bit control word from a host microprocessor as discussed in greater detail below.

A plurality of filters 275, 280, 285 and 290 are provided for filtering the current pixel luminance value Y(n) according to an associated filter kernel. Each of the filters may be a 3-tap, low-pass finite impulse response (FIR) filter. The filter kernels shown can be easily implemented by bit-shifting and adding without using any multipliers. Generally, a finite impulse response (FIR) filter can be described by the difference equation $$y(n) = \sum_{k=0}^{M-1} b_k x(n - k + \text{integer}[M/2])$$

where x(n−k+integer[M/2]) is the filter input, including a one sample delay, y(n) is the filter output, $b_k$ are the filter coefficients, and M is the filter length. Note that, for example, for a 3-tap filter, integer [3/2]=1. The set of coefficients $b_0, \ldots, b_{M-1}$ defines the filter kernel. For example, with a kernel of (2/16, 12/16, 2/16), also written in shorthand notation as (2, 12, 2), we have $b_0$=2/16, $b_1$=12/16 and $b_2$=2/16, and the output current pixel amplitude is determined according to the following equation:

$$y(n) = \frac{2}{16}x(n-1) + \frac{12}{16}x(n) + \frac{2}{16}x(n+1).$$

The multiplier for the current pixel x(n) is 12/16.

Stronger filters have kernels which multiply the current pixel amplitude by smaller fractions. For example, successively stronger filtering is provided by the filters 275, 280, 285 and 290 since the current pixel amplitude which is input to the filter is multiplied by fractions of 12/16, 10/16, 8/16 and 6/16, respectively. Stronger filters provide relatively more attenuation of a.c. components of the video image data. While the kernels disclosed herein have worked successfully in the present invention, those skilled in the art will appreciate that other kernels and filter types may also be used. Moreover, a single filter with adjustable coefficients may be used.

Thus, using the notation of the luma processor 200, the output $Y_{out}$(n) of the filter 275 is:

$$Y_{out}(n) = \frac{2}{16}Y(n-1) + \frac{12}{16}Y(n) + \frac{2}{16}Y(n+1),$$

the output of the filter 280 is $$Y_{out}(n) = \frac{3}{16}Y(n-1) + \frac{10}{16}Y(n) + \frac{3}{16}Y(n+1),$$

the output of the filter 285 is $$Y_{out}(n) = \frac{4}{16}Y(n-1) + \frac{8}{16}Y(n) + \frac{4}{16}Y(n+1),$$

and the output of the filter 290 is $$Y_{out}(n) = \frac{5}{16}Y(n-1) + \frac{6}{16}Y(n) + \frac{5}{16}Y(n+1).$$

The filter selection logic function 300 processes the difference signals d1, d2, e1 and e2 as described in connection with FIG. 3 to obtain a filter selection signal, which is in turn provided to command a multiplexer (MUX) 295 to output one of the current pixel luminance values from the filters 275, 280, 285 and 290, or the unfiltered value which is carried on line 272. The luma output is then processed using conventional compression techniques as discussed in connection with the encoder 130 of FIG. 1.

The processor 200 may also be adapted for use with pixel interpolation, where the filters 275, 280, 285, 290 provide upsampling or downsampling of the input pixel components. With upsampling, the pixel data rate is increased, and with downsampling, the pixel data rate is decreased. In either case, the sampling rate of pixels input to a filter is different from the sampling rate of pixels output from the filter. For example, upsampling may be used to transform a standard NTSC video image to a high-density television (HDTV) image, in which case filtering in accordance with the present invention can preserve image features and improve resolution. The filters may be polyphase FIR filters when pixel interpolation is employed.

Figure 3:
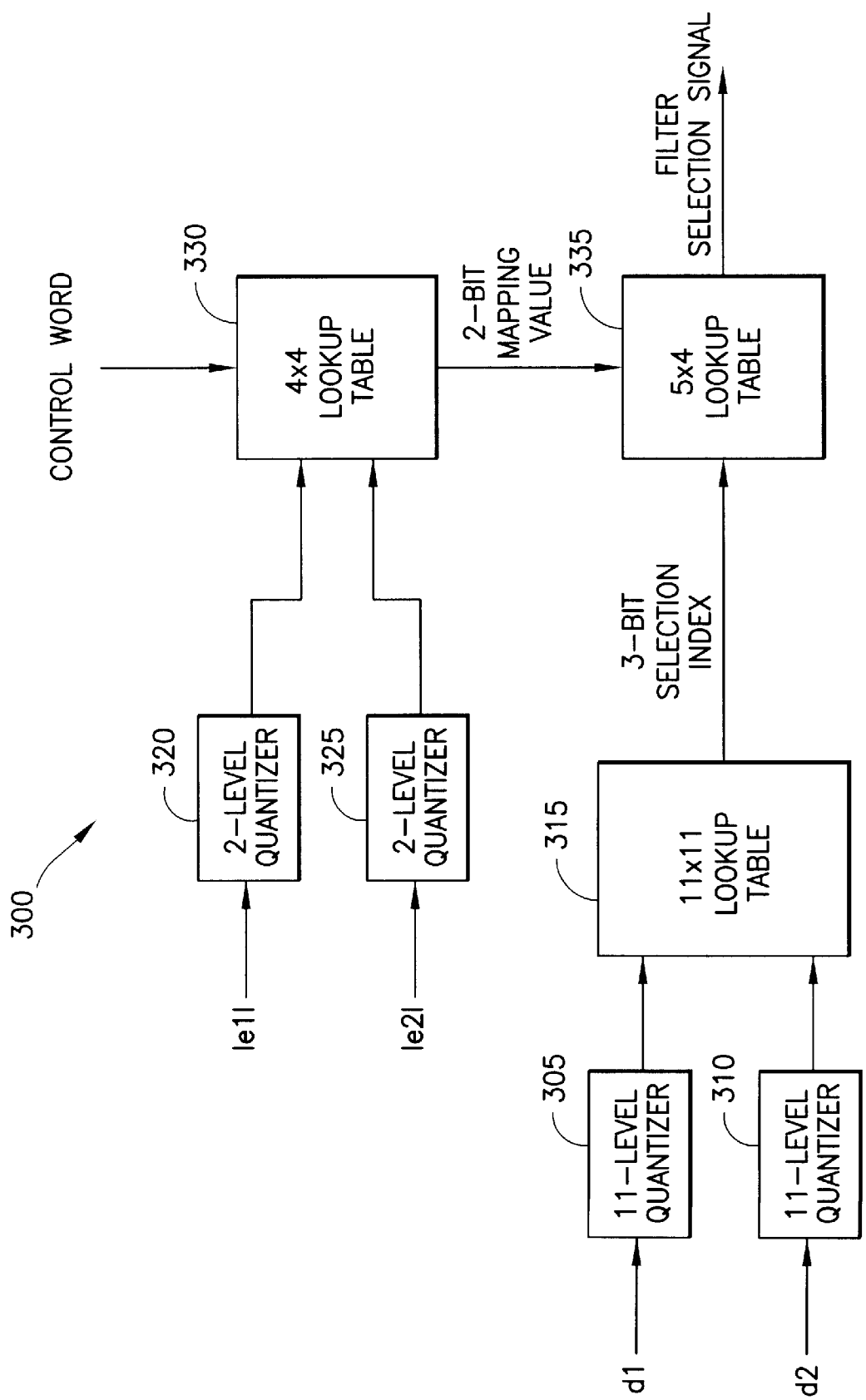
FIG. 3 is a block diagram of a filter selection logic function in accordance with the present invention.

FIG. 3 is a block diagram of a filter selection logic function in accordance with the present invention. The function, shown generally at 300, has two stages. In a first stage, a 3-bit filter selection index is generated using the difference signals d1 and d2. The quantized values of d1 and d2 are input from quantizers 305, 310 respectively to an 11×11 look-up table 315 to obtain a 3-bit selection index. The second stage of the filter selection logic function 300 maps the selection index to one of the four filter selections or to a bypass mode, where the pixel data is not filtered, according to the difference signals e1 and e2 and a user-selectable control word.

Specifically, two 11-level quantizers 305 and 310 receive and quantize the difference signals d1 and d2, respectively, to one of eleven ranges. The quantized difference signals are then provided to an 11×11 look-up table 315. The decision boundaries of the quantizers 305 and 310 may be chosen to be 1, 2, 4, 8 and 16, for example, so that the quantizers and the look-up table 315 can be implemented with simple combinational logic devices. Thus, the difference signals d1 and d2 are classified into one of the ranges or values {-127 to -16}, {-15 to -8}, {-7 to -4}, {-3, -2}, {-1}, { }, {1}, {2, 3}, {4 to 7}, {8 to 15}, and {16 to 127}.

The look-up table 315 provides a 3-bit filter selection index according to Table 1, set forth below.

TABLE 1

| d1<br>d2 | -127 to<br>-16 | -15 to<br>-8 | -7 to<br>-4 | -3 or<br>-2 | -1 | 0 | 1 | 2 or<br>3 | 4 to<br>7 | 8 to<br>15 | 16 to<br>127 |
|---|---|---|---|---|---|---|---|---|---|---|---|
| -127 to -16 | 000 | 000 | 000 | 000 | 000 | 000 | 000 | 000 | 000 | 000 | 000 |
| 15 to -8 | 000 | 100 | 100 | 100 | 100 | 000 | 100 | 100 | 100 | 000 | 000 |
| 7 to 4 | 000 | 100 | 101 | 101 | 101 | 100 | 101 | 101 | 100 | 000 | 000 |
| -3 or -2 | 000 | 100 | 101 | 101 | 110 | 100 | 110 | 101 | 101 | 100 | 000 |
| -1 | 000 | 100 | 101 | 110 | 110 | 111 | 110 | 110 | 101 | 100 | 000 |
| 0 | 000 | 000 | 100 | 100 | 111 | 111 | 111 | 100 | 100 | 000 | 000 |
| 1 | 000 | 100 | 101 | 110 | 110 | 111 | 110 | 110 | 101 | 100 | 000 |
| 2 or 3 | 000 | 100 | 101 | 101 | 110 | 100 | 110 | 101 | 101 | 100 | 000 |
| 4 to 7 | 000 | 000 | 100 | 101 | 101 | 100 | 101 | 101 | 101 | 100 | 000 |
| 8 to 15 | 000 | 000 | 000 | 100 | 100 | 000 | 100 | 100 | 100 | 100 | 000 |
| 16 to 127 | 000 | 000 | 000 | 000 | 000 | 000 | 000 | 000 | 000 | 000 | 000 |

While the above table entries have been optimized by experiment with a wide variety of video source data, it will be appreciated that the particular filter selection indexes and quantization levels may be modified to provide optimum results in different circumstances.

The following guidelines were used in designing Table 1. The selection index has only five possible values, e.g., 000, 100, 101, 110, and 111, since there are four filters and one bypass path for the pixel luma data. The number of different selection indexes can increase or decrease according to the number of possible filtering options. Additionally, the syntax of the selection filter can provide information, although this is not required to implement the present invention. For example, the first bit can indicate whether or not a filter bypass is selected, and the second and third bit can indicate the size of the pixel difference signals. For instance, if the first bit is "0", a filter bypass is selected. If the first bit is "1", active filter is selected. Furthermore, indexes of 100, 101, 110, 111 indicate that progressively stronger filters are selected since the second and third bits, e.g., 00, 01, 10, and 11, correspond to increasing decimal numbers 0, 1, 2 and 3, respectively. A relatively weaker filter is selected when the difference signals d1 and d2 indicate that the presence of a true visible luminance edge (e.g., rather than noise) is likely.

Moreover, in Table 1, the selection indexes are symmetrical with respect to the magnitudes of difference signals d1 and d2 (e.g., symmetric with respect to the diagonals of Table 1). For example, a selection index of 110 is obtained with both d1=+1, d2=-2, and with d1=-2, d2=+1. However, the selection index values are not symmetrical with respect to the signs of d1 and d2. The sign indicates whether d1 and d2 are positive or negative numbers. For moderately large magnitudes of d1 and d2 the selection index of d1 and d2 is larger when d1 and d2 have the same sign (e.g., both positive or negative) than when d1 and d2 have different signs, given that the magnitudes of d1 and d2 are the same. For instance, when d1=-5 and d2=-5, or d1=+5 and d2=+5, the selection index is 101. However, when d1=-5 and d2=+5, or d1=+5 and d2=-5, then the selection index is 100, which indicates that a weaker filter should be used than with the index of 101.

This is because the current pixel is more likely to belong to a luminance edge if the pixel values (e.g., Y(n+1), Y(n), and Y(n-1)) are continuously increasing or decreasing. That is, the probability that a continuous increase or decrease in pixel amplitude is due to noise is less than the probability that the change is due to a true change in luminance amplitude and/or chrominance amplitude which indicates the presence of an edge region in the video image.

For example, the difference signals d1=-5 and d2=+5 may be obtained from the pixel sequence {Y(n+1), Y(n), Y(n-1)}={10, 15, 20}, since d1=15-20=-5 and d2=15-10=+5. This continuously increase sequence is likely to indicate a true edge in the image, so a weaker filter should be used to avoid unnecessarily attenuating the resolution of the image. In contrast, the difference signals d1=-5 and d2=-5 are obtained from the pixel sequence {Y(n+1), Y(n), Y(n-1)}={20, 15, 20}. This sequence is not continuously increasing or decreasing. Instead, the amplitudes of Y(n+1) and Y(n-1) are both larger than Y(n). Similarly, with the sequence {Y(n+1), Y(n), Y(n-1)}={15, 20, 15}, the amplitudes of Y(n+1) and Y(n-1) are both smaller than Y(n). These latter two pixel sequences are less indicative of a true edge, and therefore more likely to be noise, so a stronger filter is applied to smooth out the pixel sequence.

Next, consider the case where d1 is zero, or in a range near zero, and d2 is outside that range, or d1 is outside the range, d2 is within the range near zero. For example, the range which includes zero may extend from {-1 to +1}. The former case, where d1 is in a range near zero, may be obtained from the pixel sequence {Y(n+1), Y(n), Y(n-1)}={20, 15, 15}, since d1=15-15=0, and d2=15-20=-5. This pixel sequence is monotonically decreasing. Here, the likelihood of an edge is relatively high when two consecutive pixels have similar values and the third pixel has a significantly different value, so the selection index is 100, which indicates a relatively mild filter should be used.

It will also be appreciated that the likelihood that the current pixel denotes an image edge is small when the current pixel and the two adjacent pixels are all approximately the same, for example, such as with the sequence {Y(n+1), Y(n), Y(n-1)}={15, 15, 16}. In this case, d1 and d2 are close to zero (e.g., d1=-1, d2=0), and the filter selection index is 111, indicating that a relatively strong filter should be used. However, there is no concern that resolution will be lost here since the current pixel luminance value will essentially be unchanged by filtering.

Referring again to the structure of the luma processor 300, two-level quantizers 320 and 325 receive, respectively, the absolute value of the difference signal e1, and the absolute value of the difference signal e2. The use of the absolute values of e1 and e2, while optional, simplifies the implementation, but does not noticeably degrade the edge-detection capability of the filter selection logic function 300. The difference signals are quantized to one of two different levels, e.g., zero or non-zero, and provided to a 4×4 lookup table 330 as shown in Table 2 below.

TABLE 2

| | Host microprocessor control word | | | |
|---|---|---|---|---|
| | 00 (Off) | 01 (Low) | 10 (Medium) | 11 (High) |
| e1 = 0 and/or e2 = 0 | 0 | 01 | 01 | 01 |
| Otherwise | 0 | 01 | 10 | 11 |

The lookup table 330 also receives a two-bit control word, for example, from a host microprocessor. This control word can be user-selectable to indicate a desired bias of the filter selection.

A control word of 00 indicates filtering should be bypassed, a control word of 01 corresponds to a bias toward a weaker filter, a control word of 10 corresponds to a medium or unbiased selection, and a control word of 11 corresponds to a bias towards a stronger filter. A low filtering level is designed to minimize the loss in image resolution at the cost of possible passing more noise to the image. A high filtering level can be used when maximum noise suppression is desired, while the medium level can be used to provide a corresponding level of noise suppression.

For example, recorded video image sources such as magnetic video tape or the like may degrade over time, thereby introducing additional noise, or a particular video data link such as a satellite link may be known to be noisy. Thus, it is possible to use a priori knowledge to suitably bias the filter selection. Alternatively, it is possible for an operator to adjust the filter strength level on a real-time basis, e.g., while viewing the video data as it is being transmitted, optionally, the operator can view the video prior to transmission to select an appropriate filter strength. In cases where it is critical to preserve every detail in the input images, the noise reducer can be turned off or bypassed with a control word of 00.

In accordance with the present invention, the difference values e1 and e2 can also be used to bias the filter selection to reduce the risk of over-filtering some edges that have a small amplitude swing. In particular, if the two pixels on the left of the current pixel, or the two pixels on the right of the current pixel have a small or zero difference (e.g., small or zero e2 or e1, respectively), the likelihood that the current pixel belongs to an image edge increases. It will be understood that while pixels on the left and right of the current pixel are referred to in the present example, the pixel locations can be arranged vertically or diagonally in a single frame, or, in a temporal filtering scheme, in successive frames (see FIG. 5).

Therefore, as shown in Table 2, if either e1=0 or e2=0, the two-bit input control word is mapped to a mapping value 01 regardless of the control word since a mild filter is desirable. For example, if the control word input is requesting a medium or unbiased filter selection (e.g., control word=10) but e1=0 and/or e2=0, then the lookup table 330 will output a mapping value of 01 instead of 10. However, if neither e1=0 or e2=0, then the mapping selection will correspond to the control word. That is, the control word which is input to the lookup table 330 will simply pass through as the mapping value which is subsequently provided to the 5×4 lookup table 335. A control word of 00 which is input to lookup table 330 to bypass filtering will not be overridden, regardless of the values of e1 and e2. It will be appreciated that while e1 and e2 were quantized to zero or non-zero values in Table 2, a quantization band around zero may also be used.

Furthermore, it will be understood that e1 and e2 can be quantized to more than two levels, but quantization to two levels has been found to be satisfactory in the preferred embodiment.

The second stage of the filter selection logic function 300 maps the two-bit mapping value from the lookup table 330 and the three-bit selection index from lookup table 315 to provide a filter selection signal. The filter selection signal commands the MUX 295 of FIG. 2 to select one of the filters 275, 280, 285 and 290, or the bypass line 272. The mapping of lookup table 335 is described in Table 3 below.

TABLE 3

| SELEC-TION INDEX | MAPPING VALUE | | | |
|---|---|---|---|---|
| | 00 | 01 | 10 | 11 |
| 000 | Bypass | Bypass | Bypass | Bypass |
| 100 | Bypass | Bypass | Filter {2,12,2} | Filter {3,10,3} |
| 101 | Bypass | Filter {2,12,2} | Filter {3,10,3} | Filter {4,8,4} |
| 110 | Bypass | Filter {3,10,3} | Filter {4,8,4} | Filter {4,8,4} |
| 111 | Bypass | Filter {4,8,4} | Filter {5,6,5} | Filter {5,6,5} |

Table 2 indicates which filter is selected as a function of the three-bit selection index and the two-bit mapping value. For example, with a mapping value of 00, a bypass is provided regardless of the selection index. With a mapping value of 01 and a selection index of 000 or 100, a bypass is again provided. With a mapping value of 01 and a selection index of 101, filter 275 having the kernel (2, 12, 2) is provided, and so forth. Accordingly, Table 3 provides a filter selection signal which accounts for the selection index and the mapping value to select an optimal filter to reduce the noise of the current pixel while avoiding unnecessary attenuation.

Figure 4:
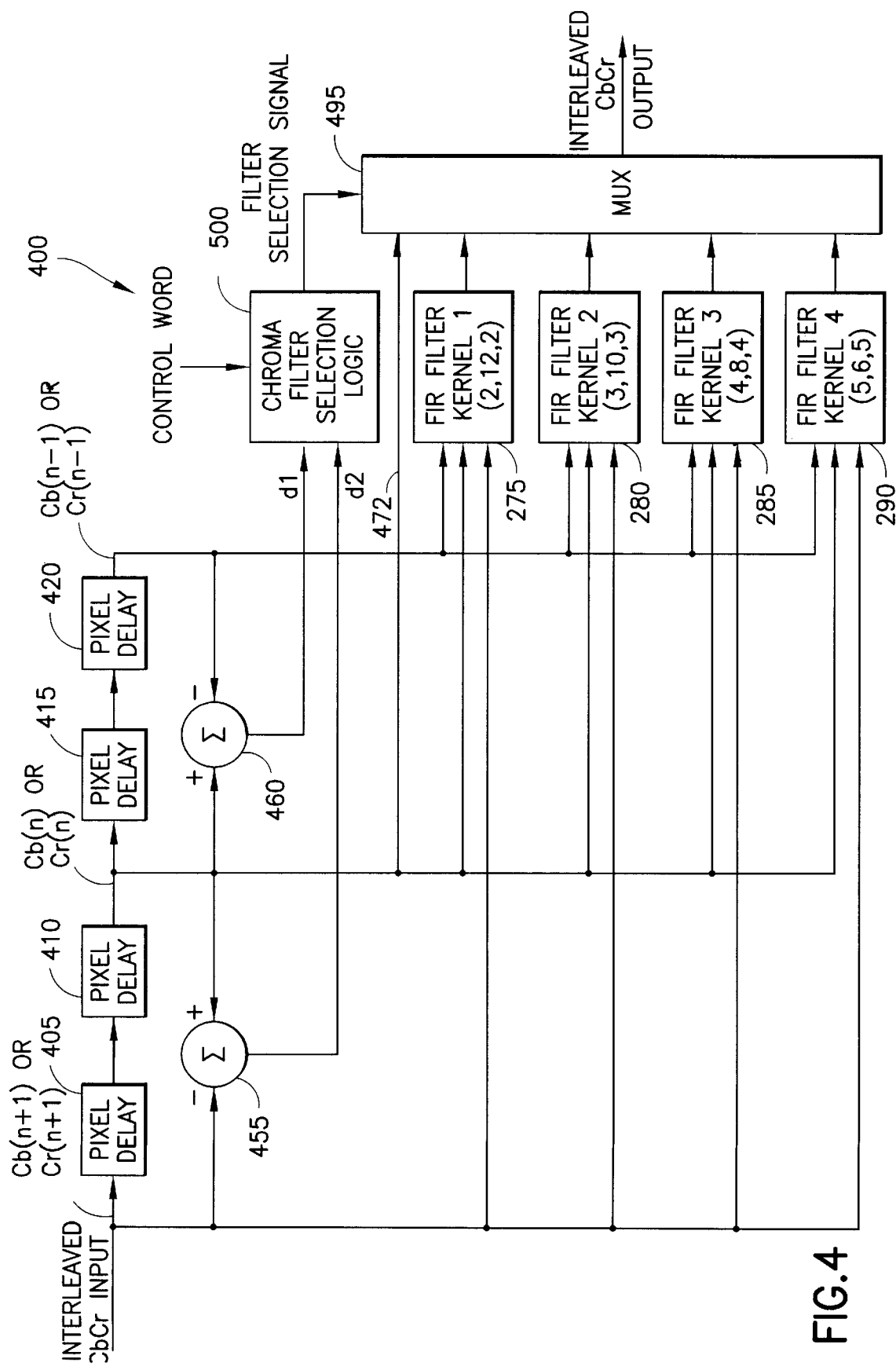
FIG. 4 is a block diagram of a chrominance noise reducer in accordance with the present invention.

FIG. 4 is a block diagram of a chrominance noise reducer in accordance with the present invention. The chrominance data is generally processed in the same manner as the luminance data as discussed herein. However, since humans are normally more sensitive to changes in luminance than to changes in chrominance, chroma edges are not as visible as luma edges in an image. Thus, it is usually sufficient to consider only one adjacent pixel on each side of the current pixel in determining an appropriate filter. Of course, more than one adjacent pixel on each side of the current pixel may be considered, if desired, and this may be appropriate in some circumstances. Or, when temporal filtering is used, more than one prior or subsequent frame may be considered, if desired (see FIG. 5).

Moreover, the chroma processor, shown generally at 400, differs from the luma processor 200 in that the chroma processor 400 uses a two-pixel delay since the chrominance data stream is comprised of interleaved Cr and Cb samples. Conceptually, the Cr and Cb signal can be considered to be processed separately by two identical noise reducers running at half the speed of the luma noise reducer. The interleaved CbCr input is provided to pixel delays 405, 410, 415 and 420. At a given clock cycle, the input to the pixel delay 405 is Cb(n+1), the input to the pixel delay 415 is the current pixel component, Cb(n), and the output from the pixel delay 420 is Cb(n−1). A subtractor 455 outputs the difference signal d2=Cb(n)−Cb(n+1), while the subtractor 460 outputs the difference signal d2=Cb(n)−Cb(n−1).

The chroma filter selection logic function 500 operates in the same manner as discussed in connection with the luma filter selection logic function 300 of FIG. 3, except that the difference signals e1 and e2 need not be calculated and used. Accordingly, the quantizers 320 and 325, and the lookup table 330 are not used, and the control word is the same as the two-bit mapping value. Referring again to FIG. 4, the difference signals d1 and d2 are provided to the filter selection logic function 500 to obtain a filter selection signal. The filter selection signal commands the MUX 495 to output the current pixel chroma value, Cb(n), without filtering on a bypass line 472, or a filtered value of Cb(n) from one of the filters 275, 280, 285, 290. In alternating clock cycles, the above process is repeated with the Cr components Cr(n+1), Cr(n) and Cr(n−1) to provide a filtered current pixel chroma sample Cr(n) from the MUX 495.

Figure 5:
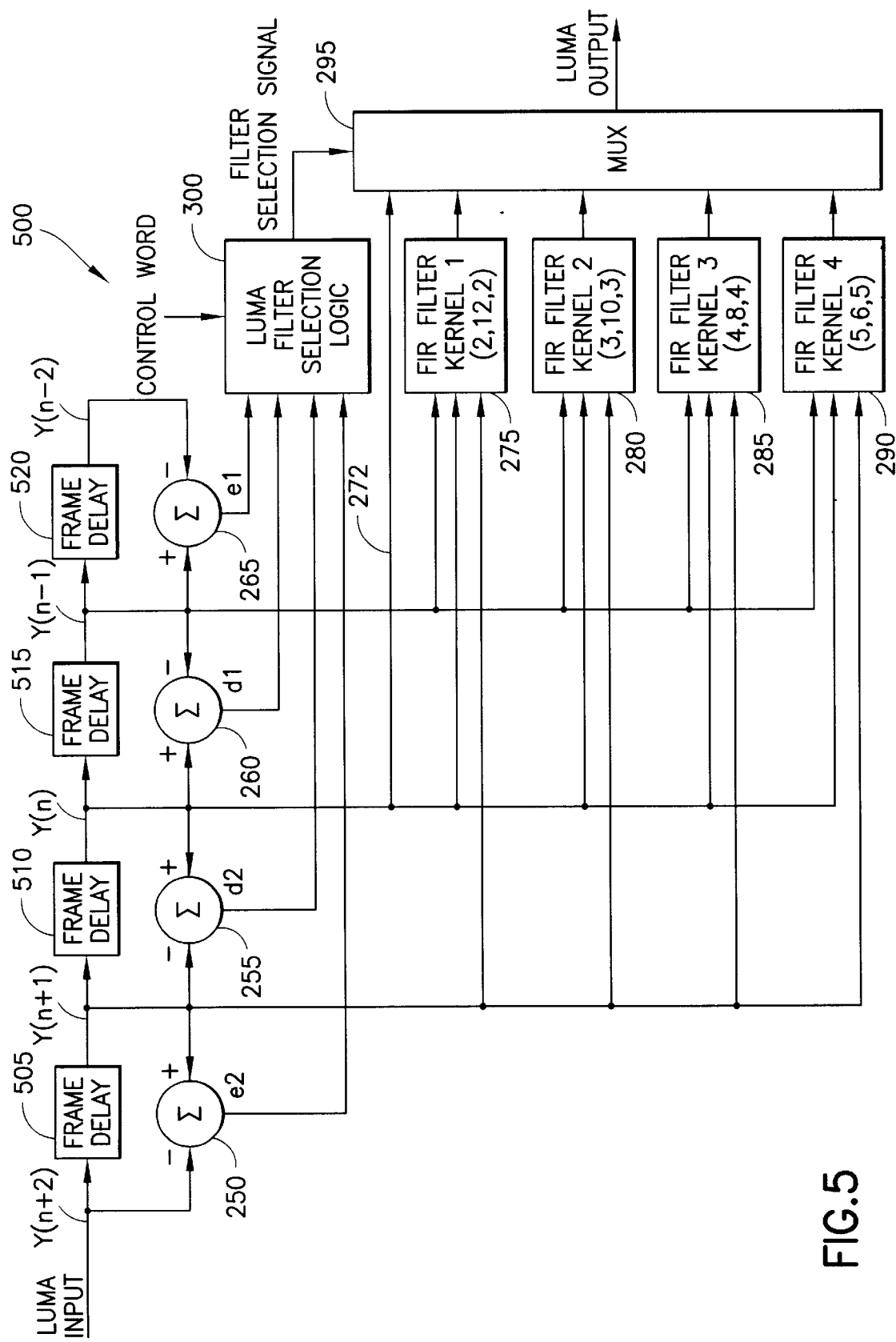

FIG. 5 is a block diagram of a luminance noise reducer with temporal filtering in accordance with the present invention. Like-numbered elements correspond to the elements in FIG. 2. Here, frame delays 505, 510, 515 and 520 allow temporal filtering over successive frames, where Y(n) represents a pixel from the current frame, Y(n+1) represents a pixel from the next future frame, Y(n+2) represents a pixel from the second next future frame, Y(n−1) represents a pixel from the next previous frame, and Y(n−2) represents a pixel from the second next previous frame.

A prototype of the noise reducer of the present invention was implemented and tested with a wide variety of video source material. Observations for representative test sequences are as shown in Table 4. The encoder was configured to operate in full resolution mode with progressive refresh, and with a refresh rate of once every thirty frames. Two B-frames were used and film mode was enabled. The video bit rate was 3.5 Mbits/sec. Table 4 indicates the video sequence and the peak signal-to-noise ratio (PSNR) as measured between the data at the input and output of the encoder's quantizer. The first column indicates the test sequence as described in Test Model Editing Committee, "Test Model 5", ISO/IEC JTC1/SC29/WG11 MPEG93/457, April 1993. The second column indicates the relative overall noise level of the video source. The third column indicates the PSNR with the noise reducer off. The fourth column indicates the PSNR with the noise reducer on. The fifth column indicates the improvement in PSNR in accordance with the noise reducer of the present invention. The increase in PSNR for each sequence is a measure of the effectiveness of the noise filter of the present invention. For example, for the "table tennis" sequence, PSNR is increased by 2.5 dB, resulting in a noticeably improved image. Good results have also been obtained with a variety of other video sequences not listed.

TABLE 4

| Sequence | Source noise level | Noise Reducer OFF PSNR (dB) | Noise Reducer ON PSNR (dB) | PSNR change (dB) |
|---|---|---|---|---|
| Original Cheerleader with added white noise (38 dB PSNR) | high | 28.8 | 29.3 | +0.5 |
| Table-tennis | medium | 34.6 | 37.1 | +2.5 |
| Original Cheerleader | low | 29.4 | 29.7 | +0.3 |
| Mobile Calendar | low | 29.0 | 29.5 | +0.5 |
| Flower Garden | low | 31.2 | 32.1 | +0.9 |
| Bus | low | 32.5 | 33.3 | +0.8 |
| Popple | low | 29.0 | 29.4 | +0.4 |

Accordingly, it can be seen that the present invention provides a method and apparatus for adaptively pre-processing pixel data to reduce noise in luminance and/or chrominance components of a current pixel. The invention is suitable for filtering pixel data for both still images and successive frames of images. Filtering for a current pixel is provided by considering a number of neighboring pixels to determine whether the current pixel is part of a luminance and/or chrominance edge in an image, or whether the current pixel includes a noise component which should be attenuated.

In a preferred embodiment, the luminance component of a current pixel is filtered based on four neighboring pixels, for example, two on the right and two on the left. In particular, the current pixel amplitude can be filtered as a function of the amplitude values of two pixels, one on the immediate right, and one on the immediate left, while the other two pixels which are one pixel removed from the current pixel can be used to fine tune the desired strength of the filtering. It is possible to use other neighboring pixels, such as those arranged above and below the current pixel in the image, and/or those arranged on a diagonal with respect to the current pixel. Any number of pixels may be used, for example, three or more on each side of the current pixel. Moreover, pixel interpolation may be used. Additionally, temporal filtering may be used alone or in conjunction with the in-frame filtering. For chrominance pixel components, it is sufficient to filter the current pixel based on only two neighboring pixels, one on the right and one on the left, for example.

It was seen that by quantizing difference signals which are indicative of amplitude differences between the current pixel and the neighboring pixels, a lookup table scheme can be implemented to obtain a filter selection signal to select an appropriate filter for the current pixel. A filter selection index is selected according to the respective signs and magnitudes of the difference signals such that the strength of the selected filter is a function of, in addition to the absolute magnitude of the difference signals, whether a sequence which includes the current pixel is continuously increasing or decreasing, monotonically increasing or decreasing, constant, or otherwise. A user-selectable control word may be provided to bias the selection index. In a simple, low-cost structure, 3-tap FIR filters are used.

Furthermore, while the example described herein uses the YCrCb color space, it should be appreciated that the present invention is suitable for use with virtually any color space. For example, the similar YUV color space can be used. Moreover, the RGB color space may also be used, in which case pixel filtering should preferably occur over four neighboring pixels since separate luminance and chrominance components are not provided for each current pixel.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for spatially filtering pre-compressed video image data which comprises at least one video frame having a plurality of pixels to reduce the presence of noise in said data, wherein each of said pixels has an associated amplitude, and a current pixel is intermediate to first and second pixels in said video frame, comprising the steps of:

determining a difference, d1, including a sign and magnitude, between the amplitude of said current pixel and the amplitude of said first pixel;

determining a difference, d2 including a sign and magnitude, between the amplitude of said current pixel and the amplitude of said second pixel;

providing a plurality of filter kernels, said filter kernels being adapted to provide successively stronger filtering of said current pixel amplitude; and selecting a particular one of said filter kernels according to said differences d1 and d2 for filtering said current pixel prior to compressing said video frame to provide stronger filtering of said current pixel amplitude when the amplitudes of said first and second pixels are both one of: (a) greater than the amplitude of said current pixel, and (b) less than the amplitude of said current pixel.

2. The method of claim 1, comprising the further step of:

selecting said particular filter kernel to provide stronger filtering of said current pixel amplitude when the magnitudes of said differences d1 and d2 are greater than a predetermined range which includes zero than when one of the magnitudes of said differences d1 and d2 is within said predetermined range.

3. The method of claim 1, comprising the further steps of:

providing a user-selectable control signal; and selecting said particular filter kernel according to said control signal to provide one of: (a) incrementally stronger, and (b) incrementally weaker filtering of said current pixel amplitude.

4. The method of claim 1, comprising the further steps of:

quantizing said differences d1 and d2; and selecting said particular filter kernel according to the quantized differences d1 and d2.

5. The method of claim 1, wherein said current, first and second pixels are intermediate to third and fourth pixels in said video frame, comprising the further steps of:

determining a difference, e1, including a sign and magnitude, between the amplitude of said first pixel and the amplitude of said third pixel;

determining a difference, e2, including a sign and magnitude, between the amplitude of said second pixel and the amplitude of said fourth pixel; and selecting said particular filter kernel according to said differences e1 and e2.

6. The method of claim 1, wherein:

a sampling rate of pixels input to said particular filter kernel is different from a sampling rate of pixels output from said particular filter.

7. A method for temporally filtering pre-compressed video image data comprising at least three successive video frames to reduce the presence of noise in said data, including a current frame, a first frame which precedes said current frame, and a second frame which follows said current frame, wherein each of said frames has a plurality of pixels, each of said pixels having an associated amplitude, and a current pixel of said current frame is intermediate to a first pixel in said first frame and a second pixel in said second frame, comprising the steps of:

determining a difference, d1, including a sign and magnitude, between the amplitude of said current pixel and the amplitude of said first pixel;

determining a difference, d2 including a sign and magnitude, between the amplitude of said current pixel and the amplitude of said second pixel;

providing a plurality of filter kernels, said filter kernels being adapted to provide successively stronger levels of filtering of said current pixel amplitude; and selecting a particular one of said filter kernels according to said differences d1 and d2 for filtering said current pixel prior to compressing said current frame according to whether the amplitudes of said first, current and second pixels form a sequence which is one of: (a) monotonically increasing, (b) monotonically decreasing, (c) continuously increasing, and (d) continuously decreasing.

8. The method of claim 7, comprising the further step of:

selecting said particular filter kernel to provide stronger filtering of said current pixel amplitude when the magnitudes of said differences d1 and d2 are greater than a predetermined range which includes zero than when one of the magnitudes of said differences d1 and d2 is within said predetermined range.

9. The method of claim 7, comprising the further steps of:

quantizing said differences d1 and d2; and selecting said particular filter kernel according to the quantized differences d1 and d2.

10. An apparatus for spatially filtering pre-compressed video image data which comprises at least one video frame having a plurality of pixels to reduce the presence of noise in said data, wherein each of said pixels has an associated amplitude, and a current pixel is intermediate to first and second pixels in said video frame, comprising:

a subtractor for determining a difference, d1, including a sign and magnitude, between the amplitude of said current pixel and the amplitude of said first pixel;

a subtractor for determining a difference, d2 including a sign and magnitude, between the amplitude of said current pixel and the amplitude of said second pixel;

a plurality of filter kernels, said filter kernels being adapted to provide successively stronger levels of filtering of said current pixel amplitude; and selection means for selecting one of said filter kernels according to said differences d1 and d2 for filtering said current pixel prior to compressing said video frame to provide stronger filtering of said current pixel amplitude when the amplitudes of said first and second pixels are both greater than the amplitude of said current pixel, or the amplitudes of said first and second pixels are both less than the amplitude of said current pixel.

11. The apparatus of claim 10, wherein:

said selection means selects said particular kernel to provide stronger filtering of said current pixel amplitude when the magnitudes of said differences d1 and d2 are greater than a predetermined range which includes zero than when one of the magnitudes of said differences d1 and d2 is within said predetermined range.

12. The apparatus of claim 10, further comprising:

means for receiving a user-selectable control signal; wherein:

said selection means selects said particular filter kernel according to said control signal to provide one of: (a) incrementally stronger, and (b) and incrementally weaker filtering of said current pixel amplitude.

13. The apparatus of claim 10, further comprising:

a quantizer for quantizing said differences d1 and d2; wherein:

said selection means selects said particular filter kernel according to the quantized differences d1 and d2.

14. The apparatus of claim 10, wherein said current, first and second pixels are intermediate to third and fourth pixels in said video frame, further comprising:

a subtractor for determining a difference, e1, including a sign and magnitude, between the amplitude of said first pixel and the amplitude of said third pixel;

a subtractor for determining a difference, e2, including a sign and magnitude, between the amplitude of said second pixel and the amplitude of said fourth pixel; wherein:

said selection means selects a particular one of said filter kernels according to said differences e1 and e2 for filtering said current pixel.

15. The apparatus of claim 10, wherein:

a sampling rate of pixels input to said particular kernel is different from a sampling rate of pixels output from said particular filter.

16. An apparatus for temporally filtering video image data comprising at least three successive video frames to reduce the presence of noise in said data, including a current frame, a first frame which precedes said current frame, and a second frame which follows said current frame, wherein each of said frames has a plurality of pixels, each of said pixels having an associated amplitude, and a current pixel of said current frame is intermediate to a first pixel in said first frame and a second pixel in said second frame, comprising:

a subtractor for determining a difference, d1, including a sign and magnitude, between the amplitude of said current pixel and the amplitude of said first pixel;

a subtractor for determining a difference, d2 including a sign and magnitude, between the amplitude of said current pixel and the amplitude of said second pixel;

a plurality of filter kernels, said filter kernels being adapted to provide successively stronger levels of filtering of said current pixel amplitude; and selection means for selecting one of said filter kernels according to said differences d1 and d2 for filtering said current pixel prior to compressing said current frame according to whether the amplitudes of said first, current and second pixels form a sequence which is one of: (a) monotonically increasing, (b) monotonically decreasing, (c) continuously increasing, and (d) continuously decreasing.

17. The apparatus of claim 16, wherein:

said selection means selects said particular filter kernel to provide stronger filtering of said current pixel amplitude when the magnitudes of said differences d1 and d2 are greater than a predetermined range which includes zero than when one of the magnitudes of said differences d1 and d2 is within said predetermined range.

18. The apparatus of claim 16, further comprising:

a quantizer for quantizing said differences d1 and d2; wherein:

said selection means selects said particular filter kernel according to the quantized differences d1 and d2.

19. The method of claim 1, wherein:

each of said filter kernels provides a non-zero attenuation of said current pixel amplitude.

20. The method of claim 7, wherein:

each of said filter kernels provides a non-zero attenuation of said current pixel amplitude.

21. The apparatus of claim 10, wherein:

each of said filter kernels provides a non-zero attenuation of said current pixel amplitude.

22. The apparatus of claim 16, wherein:

each of said filter kernels provides a non-zero attenuation of said current pixel amplitude.

23. An apparatus for temporally filtering video image data comprising at least three successive video frames to reduce the presence of noise in said data, including a current frame, a first frame which precedes said current frame, and a second frame which follows said current frame, wherein each of said frames has a plurality of pixels, each of said pixels having an associated amplitude, and a current pixel of said current frame is intermediate to a first pixel in said first frame and a second pixel in said second frame, comprising:

a subtractor for determining a difference, d1, including a sign and magnitude, between the amplitude of said current pixel and the amplitude of said first pixel;

a subtractor for determining a difference, d2 including a sign and magnitude, between the amplitude of said current pixel and the amplitude of said second pixel;

a plurality of filter kernels, said filter kernels being adapted to provide successively stronger levels of filtering of said current pixel amplitude; and selection means for selecting one of said filter kernels according to said differences d1 and d2 for filtering said current pixel prior to compressing said current frame to provide stronger filtering of said current pixel amplitude when the amplitudes of said first and second pixels are both greater than the amplitude of said current pixel, or the amplitudes of said first and second pixels are both less than the amplitude of said current pixel.

24. A method for temporally filtering pre-compressed video image data comprising at least three successive video frames to reduce the presence of noise in said data, including a current frame, a first frame which precedes said current frame, and a second frame which follows said current frame, wherein each of said frames has a plurality of pixels, each of, said pixels having an associated amplitude, and a current pixel of said current frame is intermediate to a first pixel in said first frame and a second pixel in said second frame, comprising the steps of:

determining a difference, d1, including a sign and magnitude, between the amplitude of said current pixel and the amplitude of said first pixel;

determining a difference, d2 including a sign and magnitude, between the amplitude of said current pixel and the amplitude of said second pixel;

providing a plurality of filter kernels, said filter kernels being adapted to provide successively stronger levels of filtering of said current pixel amplitude; and selecting a particular one of said filter kernels according to said differences d1 and d2 for filtering said current pixel prior to compressing said current frame to provide stronger filtering of said current pixel amplitude when the amplitudes of said first and second pixels are both greater than the amplitude of said current pixel, or the amplitudes of said first and second pixels are both less than the amplitude of said current pixel.

* * * * *